US012073545B2

(12) United States Patent
Effler

(10) Patent No.: US 12,073,545 B2
(45) Date of Patent: Aug. 27, 2024

(54) METHOD FOR LARGE AREA INSPECTION

(71) Applicant: The Boeing Company, Chicago, IL (US)

(72) Inventor: Richard A. Effler, Hazelwood, MO (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 17/508,253

(22) Filed: Oct. 22, 2021

(65) Prior Publication Data

US 2023/0131977 A1 Apr. 27, 2023

(51) Int. Cl.
*G06T 7/00* (2017.01)
*B64C 39/02* (2023.01)
(Continued)

(52) U.S. Cl.
CPC .......... *G06T 7/0002* (2013.01); *B64C 39/024* (2013.01); *G06F 18/213* (2023.01);
(Continued)

(58) Field of Classification Search
CPC ......... G06T 7/0002; G06T 3/40; G06T 5/007; G06T 7/11; G06T 7/80;
(Continued)

(56) References Cited

U.S. PATENT DOCUMENTS

| 2016/0005152 A1* | 1/2016 | Yang | G06T 5/73 |
| | | | 382/275 |
| 2016/0022389 A1* | 1/2016 | Esbech | G01J 3/0224 |
| | | | 250/208.1 |

(Continued)

FOREIGN PATENT DOCUMENTS

| AU | 2020323956 B2 * | 7/2022 | G06K 9/3233 |
| CN | 111179270 A * | 5/2020 | |

(Continued)

OTHER PUBLICATIONS

Donecle, "Donecle: Home Page", Jan. 1, 2019, pp. 1-4, retrieved on Oct. 22, 2021, retrieved from internet: https://www.donecle.com/.
(Continued)

*Primary Examiner* — Emily C Terrell
*Assistant Examiner* — Stefano Anthony Dardano
(74) *Attorney, Agent, or Firm* — Coats and Bennett, PLLC

(57) ABSTRACT

A computing device is configured to detect inconsistencies on a vehicle that are typically small and difficult to detect using conventional inspection techniques. Particularly, a spotlight illuminates a target area on the vehicle. The color of the spotlight is the same color as the ambient light illuminating the vehicle but is a higher intensity. Additionally, the color of the spotlight and the ambient light is selected based on the type of inconsistencies expected to be detected. Images of the target area are then captured, digitally processed, and stored in memory, such as a database, for example. Based on the processing of these images, a weighting coefficient is computed and used to generate an enhanced contrast feature map. Inconsistencies are then detected based on the enhanced contrast feature map.

26 Claims, 12 Drawing Sheets

(51) Int. Cl.
  *G06F 18/213* (2023.01)
  *G06T 3/40* (2024.01)
  *G06T 5/90* (2024.01)
  *G06T 7/11* (2017.01)
  *G06T 7/80* (2017.01)
  *G06V 10/141* (2022.01)
  *G06V 10/75* (2022.01)
  *G06V 20/10* (2022.01)
  *B64U 10/13* (2023.01)
  *B64U 101/30* (2023.01)

(52) U.S. Cl.
  CPC .............. *G06T 3/40* (2013.01); *G06T 5/90* (2024.01); *G06T 7/11* (2017.01); *G06T 7/80* (2017.01); *G06V 10/141* (2022.01); *G06V 10/751* (2022.01); *G06V 20/10* (2022.01); *B64U 10/13* (2023.01); *B64U 2101/30* (2023.01); *G06T 2207/10032* (2013.01); *G06T 2207/20021* (2013.01); *G06T 2207/20081* (2013.01); *G06T 2207/20084* (2013.01); *G06T 2207/30248* (2013.01)

(58) Field of Classification Search
  CPC . G06T 2207/10032; G06T 2207/20021; G06T 2207/20081; G06T 2207/20084; G06T 2207/30248; G06T 2207/10024; G06T 2207/30108; G06T 7/0004; B64C 39/024; G06F 18/213; G06V 10/141; G06V 10/751; G06V 20/10; G06V 10/774; G06V 10/56; G06V 20/17; B64U 10/13; B64U 2101/30; B64U 2101/25; B64F 5/60

See application file for complete search history.

(56) References Cited

U.S. PATENT DOCUMENTS

2021/0299879 A1* 9/2021 Pinter .................... B25J 9/1697
2022/0092766 A1* 3/2022 Haynes .................. G01C 11/04

FOREIGN PATENT DOCUMENTS

WO    WO-2019211068 A1 * 11/2019 .......... B60W 60/001
WO    WO-2020138803 A1 * 7/2020 ............. G06F 16/50

OTHER PUBLICATIONS

Donecle, "Donecle: Use Cases", Jan. 1, 2019, pp. 1-7, retrieved on Oct. 22, 2021, retrieved from internet: https://www.donecle.com/use-cases/.

Donecle, "Donecle: Our Solution", Jan. 1, 2019, pp. 1-9, retrieved on Oct. 22, 2021, retrieved from internet: https://www.donecle.com/solution/#.

Github, "Keras implementation of RetinaNet object detection", Date Published Oct. 6, 2020, pp. 1-10, retrieved on Oct. 19,2021, retrieved from internet: https://github.com/fizyr/keras-retinanet.

* cited by examiner

PROCESSING CIRCUITRY
182

COMMUNICATIONS INTERFACE UNIT/MODULE
190

DIGITAL IMAGE OBTAINING UNIT/MODULE
192

ENHANCED CONTRAST FEATURE MAP GENERATING UNIT/MODULE
194

DAMAGE DETECTION UNIT/MODULE
196

TRAINING DATA STORAGE UNIT/MODULE
198

FIG. 11

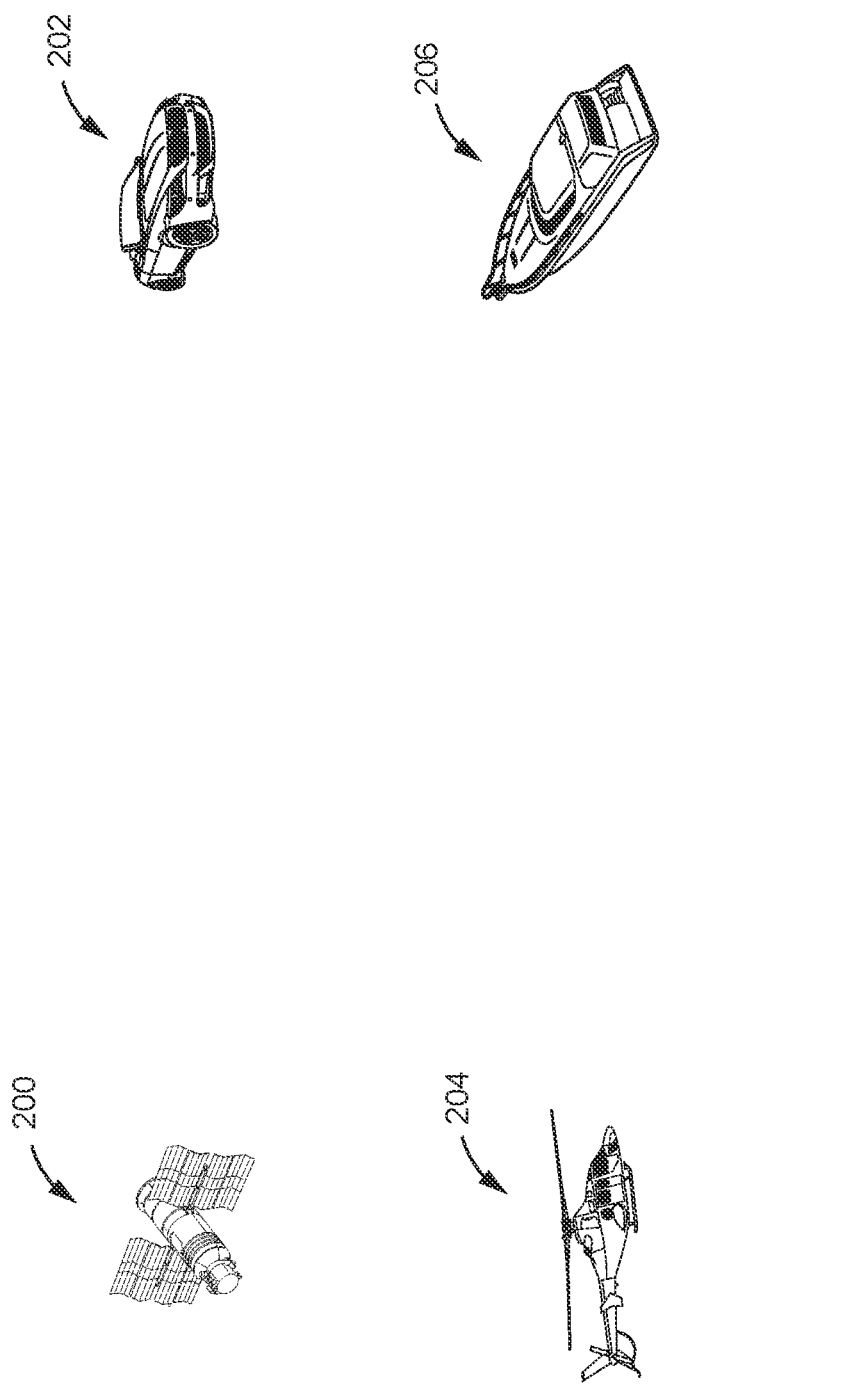

METHOD FOR LARGE AREA INSPECTION

TECHNICAL FIELD

The present disclosure relates generally to inspection techniques for large structures, and more particularly to systems and methods for inspecting large areas of vehicles such as aircraft.

BACKGROUND

Many industries typically expend a large amount of time and money inspecting their products for inconsistencies, irregularities, artifacts, impacts (e.g., damage), and the like. Consider, for example, the aerospace industry. Manufacturers and operators of commercial aircraft are required to follow an inspection program approved by an appropriate federal authority, such as the Federal Aviation Administration (FAA). Generally, the type of inspection to be performed on an aircraft will vary with the type of aircraft, as well as with different usage parameters, such as the number of flight hours, the calendar time (e.g., monthly, bi-annually, etc.), and the number of flight cycles.

Conventional inspection approaches are based on manual inspections which take more time than desired and relies on the skill of the operator.

BRIEF SUMMARY

One example is a computing device comprising a memory configured to store computer-readable program code and processing circuitry that executes the computer-readable program code. In this aspect, a digital image of a target area of a vehicle is obtained by the device. The target area is illuminated by ambient light and a spotlight having a predominant color that is selected based on a type of inconsistency expected to be detected. So obtained, an enhanced contrast feature map is generated based on a feature map of the digital image. The enhanced contrast feature map comprises scaled-up pixel values generated from selected pixel values in the feature map. An inconsistency in the target area is then detected based on the scaled-up pixel values in the enhanced contrast feature map.

BRIEF DESCRIPTION OF THE DRAWINGS

The illustrations provide examples and are not limited by the accompanying figures with like references indicating like elements.

FIG. 11 is a block diagram illustrating example processing circuitry according to one or more aspects of the present disclosure.

FIG. 12 illustrates some example vehicles suitable for use with aspects of the present disclosure.

DETAILED DESCRIPTION

Figure 1:
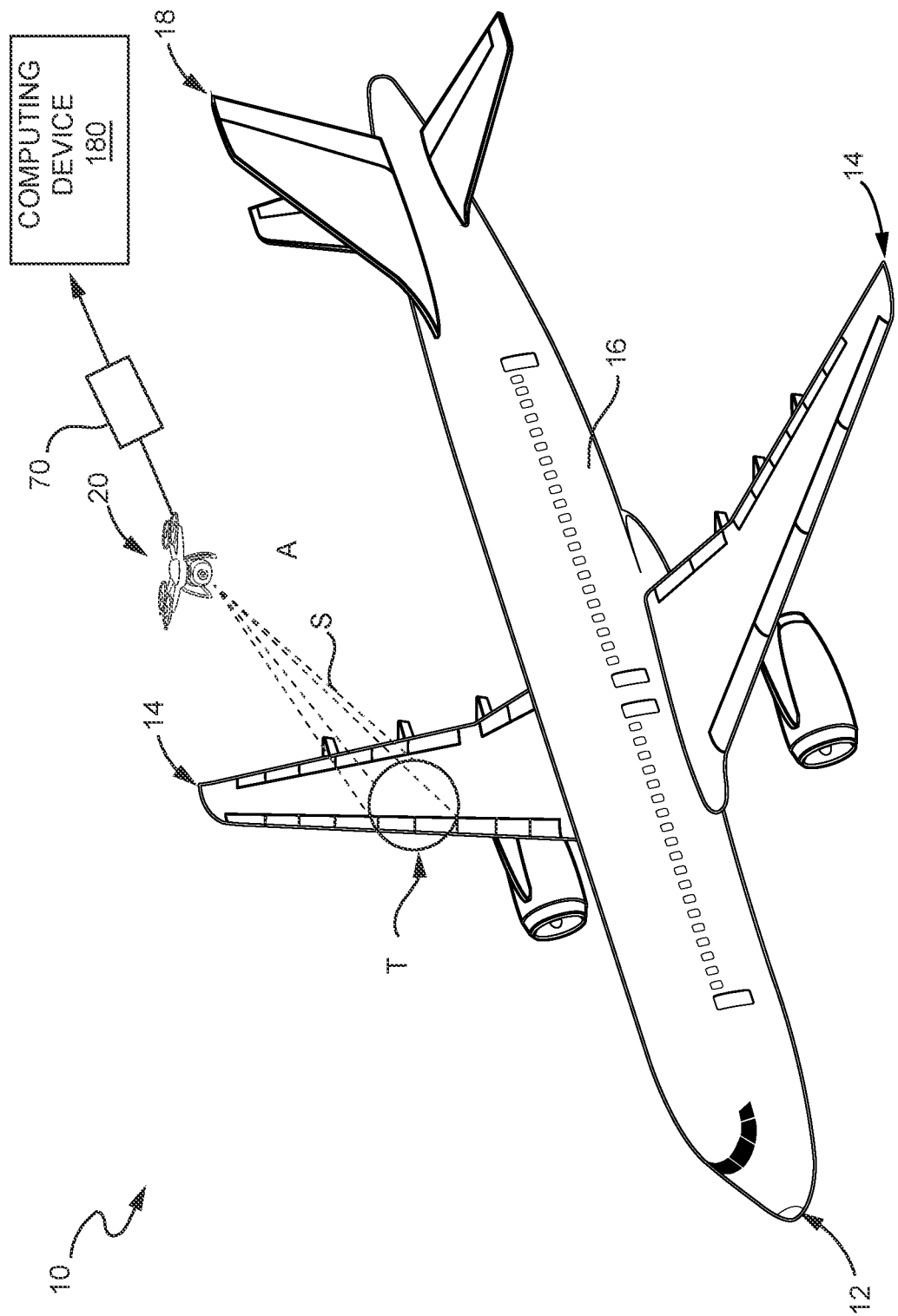
FIG. 1 is a perspective view of a vehicle, and particularly, an aircraft, suitable for use in one aspect of the present disclosure.

Aspects of the present disclosure configure a computer to detect inconsistencies on the surface of a vehicle, such as an aircraft, for example that are typically difficult to detect using conventional inspection techniques. In one example a target area is illuminated on a vehicle, for example with a spotlight, which may, in some aspects, be drone-mounted. The color of the spotlight is the same color as the ambient light illuminating the vehicle and is also a higher intensity. Additionally, the color of the spotlight and the ambient light is selected based on the type of inconsistencies expected to be detected. The color of the inconsistencies on the vehicle may be different than the color of any background artifacts (e.g., the surface of the vehicle). Utilizing different color lighting enhances the contrast between those artifacts and any inconsistencies, thereby making the inconsistencies easier to detect.

Images of the target area are then captured, digitally processed, and stored in memory, such as a database, for example. Based on the processing of these images, a weighting coefficient is computed and used to generate an enhanced contrast feature map.

In one aspect, generating the enhanced contrast feature map is accomplished using a modified pooling function. Particularly, a feature map of the image is partitioned into a plurality of subsections. Each subsection is associated with a particular pixel value for each color—for example, red (R), green (G), and blue (B). Pixel values are then selected from each subsection and scaled using the weighting coefficient, for example a value over a threshold or greatest value. There may be a single weighting coefficient used for all colors, or one weighting coefficient for each color.

The enhanced contrast feature map is generated using the selected scaled pixel values. The inconsistency is then identified based on the scaled pixel values in the enhanced contrast feature map.

In at least one aspect, the process of computing the weighting coefficient and generating the enhanced contrast feature map based on the weighting coefficient is performed iteratively. The results are then used to train a neural network. Particularly, with each iteration, the present aspects compute a mean average precision score for the enhanced contrast feature map. As is known in the art, a mean average precision score is a metric used to indicate the output of a computer vision model. In the context of the present disclosure, it is a value between 0 and 1 that indicates how well the enhanced contrast feature map functions to detect inconsistencies. With each iteration, the mean average precision is compared against the previously calculated mean average precision score. This continues until the weighting coefficient is optimized. More specifically, the enhanced contrast feature map having the highest mean average precision score is determined to have been generated using an optimized weighting coefficient. This optimized weighting coefficient, and its associated enhanced contrast feature map, are then utilized to detect the inconsistencies in the vehicle, and further, to train the neural network for future inconsistencies detection models.

Turning now to the drawings, FIG. 1 illustrates a vehicle suitable for use with aspects of the present disclosure. In the illustrated example, the vehicle is an aircraft 10. However, those of ordinary skill in the art will appreciate that this is for illustrative purposes only. In other examples, the vehicle may be another type of vehicle including, but not limited to, ships, cars, spacecraft, and the like. Thus, as described in more detail later, detecting inconsistencies on vehicles other than an aircraft 10 using the aspects disclosed herein is also possible.

As seen in FIG. 1, aircraft 10 includes a nose 12, wings 14, a fuselage 16, and a tail 18. Over time, and as seen later in more detail, inconsistencies may appear on a surface of aircraft 10. Agencies (e.g., commercial carriers, etc.) typically conduct regular inspections of the aircraft 10 to detect these inconsistencies Conventional systems often rely on the skill of the operator to identify inconsistencies. Additionally, manual inspections may require additional equipment (e.g., cranes) to reach areas of interest. Such manual inspections may take longer than desired.

Aspects described herein address these and other issues. By way of example only, different vehicles often have slightly different design features. Such different design features present challenges for conventional methods of detecting inconsistencies. The aspects described herein, however, utilize increased input image resolution, and thus, are agnostic to such differences.

In other examples, the sizes of the inconsistencies, which are often very small (e.g., too small to see with the unaided eye) present challenges for conventional methods for detecting inconsistencies. So, too, do the variable operating distances of the sensors used in conventional methods to detect the inconsistencies. Another design challenge considered by the aspects described herein are the variable resolutions of the images used for training. The aspects described herein mitigate these design challenges, however, by partitioning the captured images into variable tiles for training and/or analysis.

Another design challenge mitigated by the aspects described herein is the size of the dataset used for training and/or analysis. That is, conventional methods of detecting inconsistencies have access only to a small, limited dataset of inconsistencies. Further, most of the images in these datasets relate to a limited number of inconsistency types. In some scenarios, the ability of conventional methods to detect at least some types of inconsistencies is limited and the data used by the conventional methods to detect inconsistencies is itself limited. The aspects described herein take these and other factors into account by augmenting the number of images in a dataset and by implementing focal loss functionality. As used herein, focal loss functionality address imbalances while performing object detection tasks (e.g., when detecting the surface inconsistencies on a vehicle). Focal loss functions typically apply a modulating term to a cross entropy loss in order to focus learning on hard-to-detect inconsistencies.

Aspects of examples herein improve the functioning of a computer by reducing processing time. For example, some implementations improve image processing time by using a combination of a RETINANET architecture, a RESNET 101 backbone, and a Feature Pyramid Network (FPN).

As seen in FIG. 1, aspects of the present disclosure utilize an unmanned aerial vehicle (UAV) 20, such as a drone, for example, to illuminate a target area T of aircraft 10 with a spotlight S. The target area T is generally a small subsection of the entire aircraft 10. According to the present aspects, the color of the spotlight S is the same as the color of the ambient light A illuminating aircraft 10 and is a higher intensity. Further, the color of the ambient light A and the spotlight S are specifically selected based on the type of inconsistency to be detected. As previously stated, the color of the inconsistencies on aircraft 10 will be different than the color of the background (e.g., the wing 14). Using different color lighting to illuminate the target area T around the inconsistencies, therefore, enhances the contrast between the inconsistencies and the background making them much easier to detect.

Figure 2A:
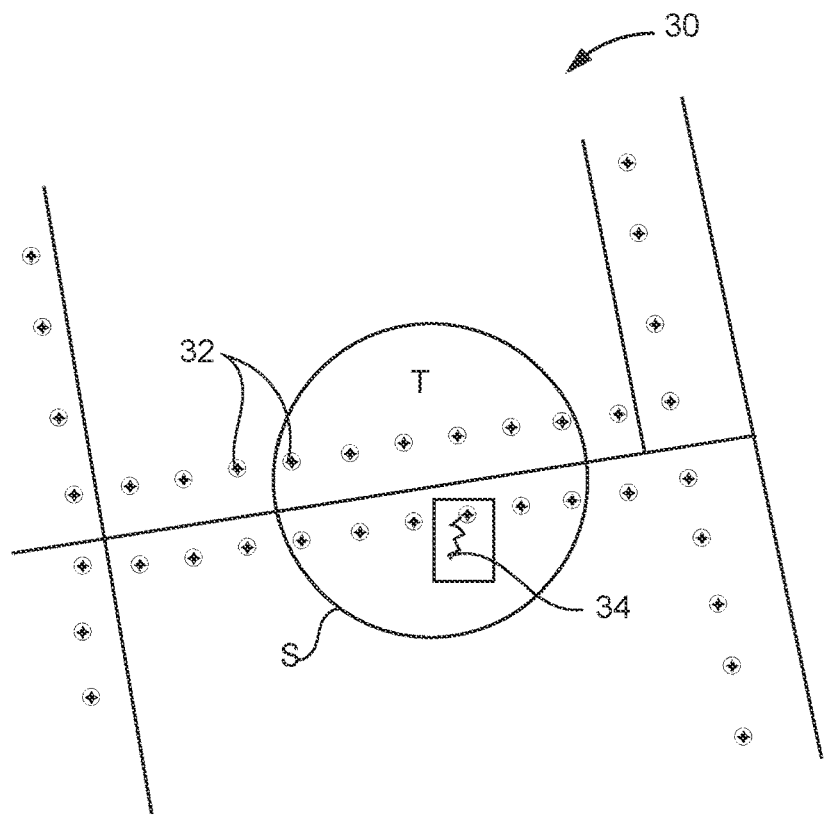
FIGS. 2A-2B are perspective views of some example types of inconsistencies that can be detected according to one or more aspects of the present disclosure.
Figure 2B:
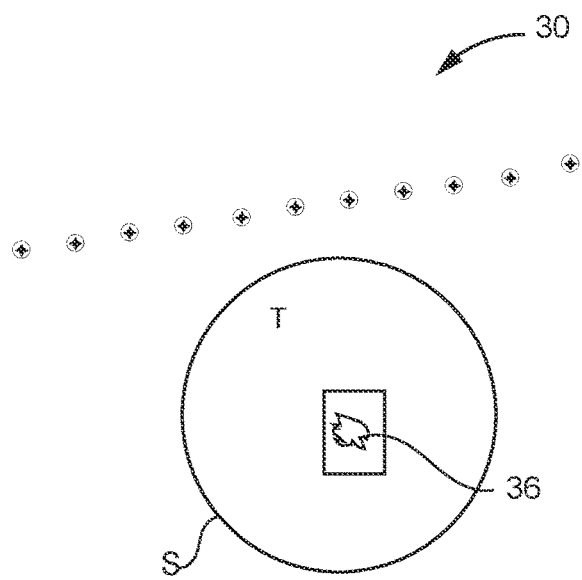

By way of example only, FIGS. 2A-2B illustrate examples of some of the types of inconsistencies 30 that can be detected according to the present aspects. Particularly, FIG. 2A illustrates a small surface crack 34 emanating from a screw 32. FIG. 2B illustrates a patch of rust 36 formed on a surface of aircraft 10. In each figure, the target area T around inconsistency 30 is illuminated by a spotlight S.

The color of the ambient light A and the spotlight S are selected based on the inconsistency to be detected. For example, the color of crack 34 in FIG. 2A may be dark when compared to the color of the background (e.g., the light color of the aircraft skin). In this case, the ambient light A and the spotlight S used to illuminate the crack 34 may be blue color light. Selecting to illuminate the target area T with the blue color light enhances the contrast between the crack 34 and the surface of aircraft 10 thereby making the crack 34 easier to detect.

Similarly, the rust patch 36 of FIG. 2B is expected to be primarily red in color. As such, red light would not be selected for the ambient light A or the spotlight S. Rather, according to the present aspects, a light color other than red (e.g., blue light) would be selected for both the ambient light A and the spotlight S to enhance the contrast between the red color of the rust patch 36 and the surface of aircraft 10. Such contrast makes the rust patch 36 easier to detect.

Figure 10:
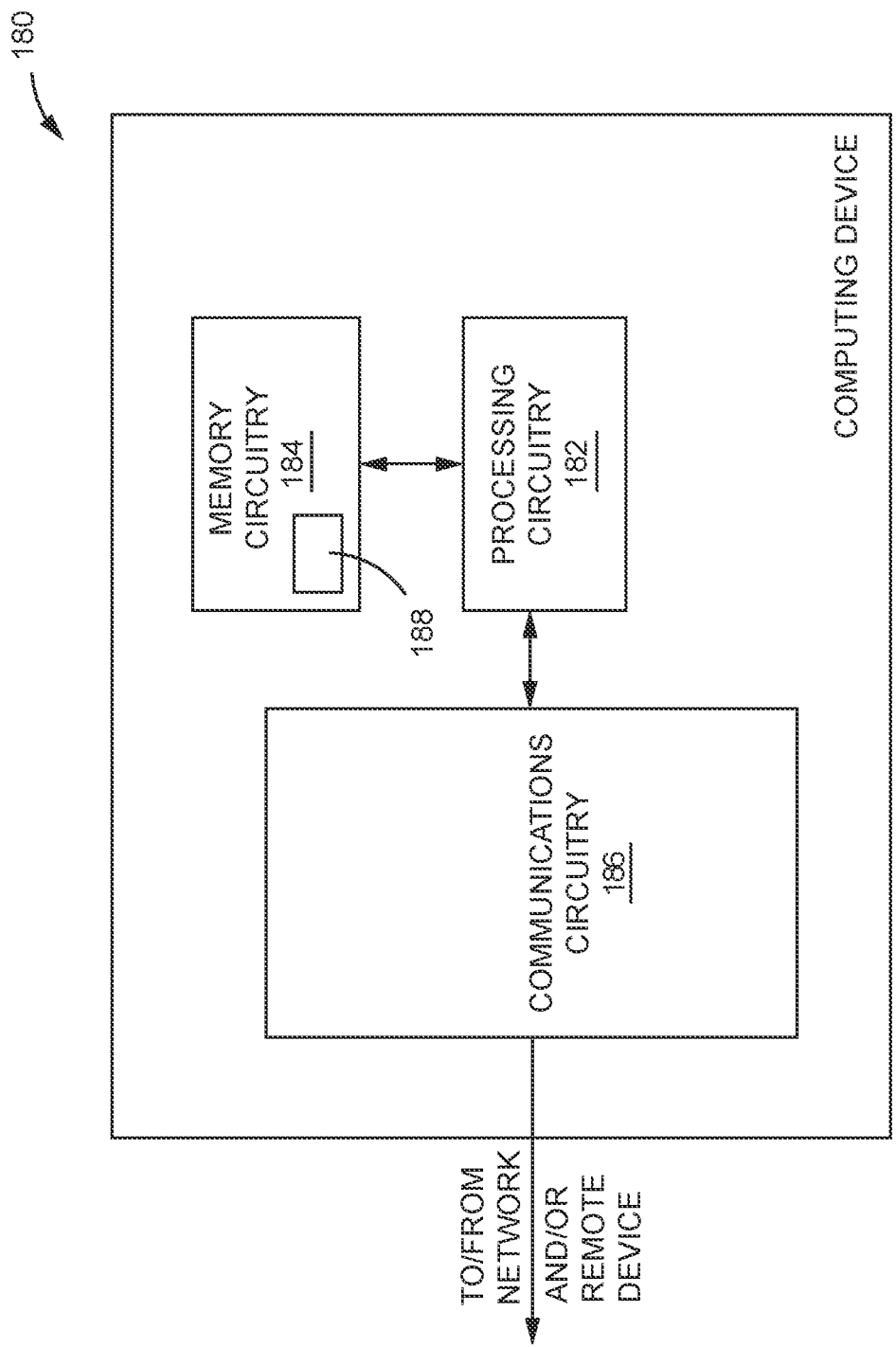
FIG. 10 is a block diagram illustrating an example computing device configured according to one or more aspects of the present disclosure.

Next, UAV 20 captures images 70 of the target area T and transmits the images 70 to a computing device (180) (see FIGS. 1, 10).

Figure 3:
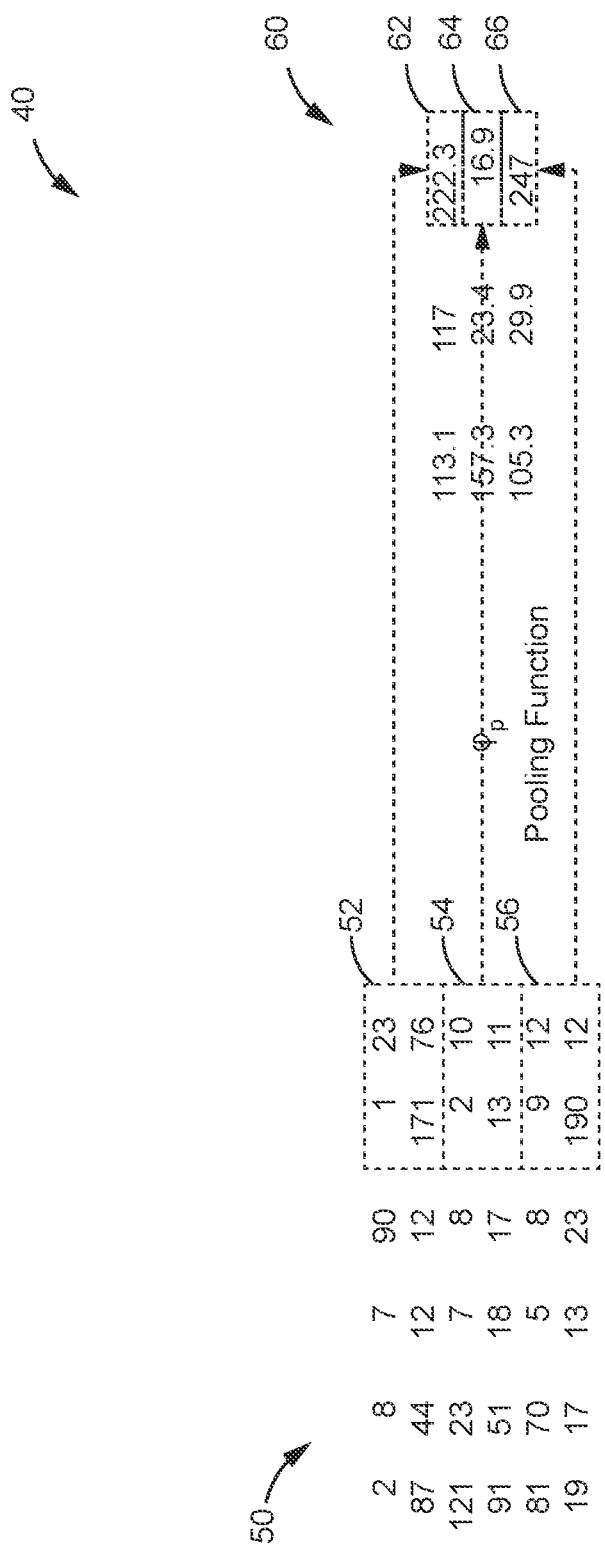
FIG. 3 illustrates a modified pooling function according to one aspect of the present disclosure.

FIG. 3 illustrates a modified pooling function 40. Computing device 180 performs imaging processing on the captured image 70 using the pooling function 40. The pooling function 40 emboldens the captured image 70 to generate an enhanced image or scaled-up image 76. The pooling function 40 increases gradients in color in the image 70 causing small color differences in inconsistencies 30 to be enhanced.

The pooling function 40 generates a feature map 50 for the captured image 70. The feature map 50 comprises a plurality of numerical values that represent image characteristics for each pixel. For example, the image characteristic may be the amount of Red, Green, and Blue (RGB) light. Optionally, the image characteristic may be the hue, saturation, and luminance (HSL).

The feature map 50 is partitioned into a plurality of feature map subsections 52, 54, 56. Each feature map sub-section 52, 54, 56 is associated with a particular color of light—i.e., R, G, B. That is, each feature map sub-section 52, 54, 56 is associated with a corresponding color channel. The present aspects then extract the highest pixel value from each of the feature map subsections 52, 54, 56, and multiply that value by a weighting coefficient. In one aspect, the weighting coefficient used to scale-up the highest pixel value is different for each color channel. The resultant scaled-up pixel values 62, 64, 66 are then used to generate the enhanced contrast feature map 60, which according to the present aspects, is then used to detect the inconsistency 30 in target area T.

By way of example only, consider feature map subsections 52, 54, 56 to be respectively associated with colors R, G, B. The highest pixel value in each feature map subsection 52, 54, 56 is therefore '171,' '13,' and '190,' respectively. Aspects of the present disclosure extract each of these pixel values and scale them by multiplying those values by a weighting coefficient. The result is the corresponding scaled-up pixel values 62, 64, 66 that comprise the enhanced contrast feature map 60. That is, the R pixel value '171' in feature map subsection 52 scales-up to pixel value '222.3,' while the G and B pixel values '13' and '190' in feature map subsections 54 and 56 scale-up to pixel values '16.9' and '247,' respectively. The scaled-up pixel values enhance the contrast between the inconsistencies 30 and the background color(s) thereby making the inconsistencies 30 in target area T easier to detect.

It should be noted that, according to the present disclosure, the same weighting coefficient may be used to scale-up each of the highest pixel values in feature map subsections 52, 54, 56. However, those of ordinary skill in the art should appreciate that the present disclosure is not so limited. In one aspect, for example, a different weighting coefficient is used for one or more of the feature map subsections 52, 54, 56. Therefore, in at least one aspect, the highest pixel values in each of a plurality of red-associated feature map subsections, such as feature map subsection 54, are multiplied by a first weighting coefficient. The highest pixel values in each of a plurality of green-associated feature map subsections, such as feature map subsection 56, are multiplied by a second weighting coefficient that is different from the first weighting coefficient. Similarly, the highest pixel values in each of a plurality of blue-associated feature map subsections, such as feature map subsection 56, are multiplied by a third weighting coefficient that is different from one or both of the first and second weighting coefficients.

Further, the weighting coefficient can be determined in any number of ways. For example, in one aspect, the weighting coefficient is proportional to an expected amount of light in a same spectrum of the ambient light and the spotlight. In another aspect, the weighting coefficient is defined based on the color of the ambient light illuminating the vehicle and the color of the vehicle.

Additionally, the present aspects provide a "training" stage in which a large pool of "training" images are processed and used to train a neural network, for example, to detect the inconsistencies 30 on the surface of a vehicle, such as aircraft 10. According to the present aspects, this training stage provides benefits and advantages that conventional digital processing techniques do not or cannot provide.

Figure 4B:
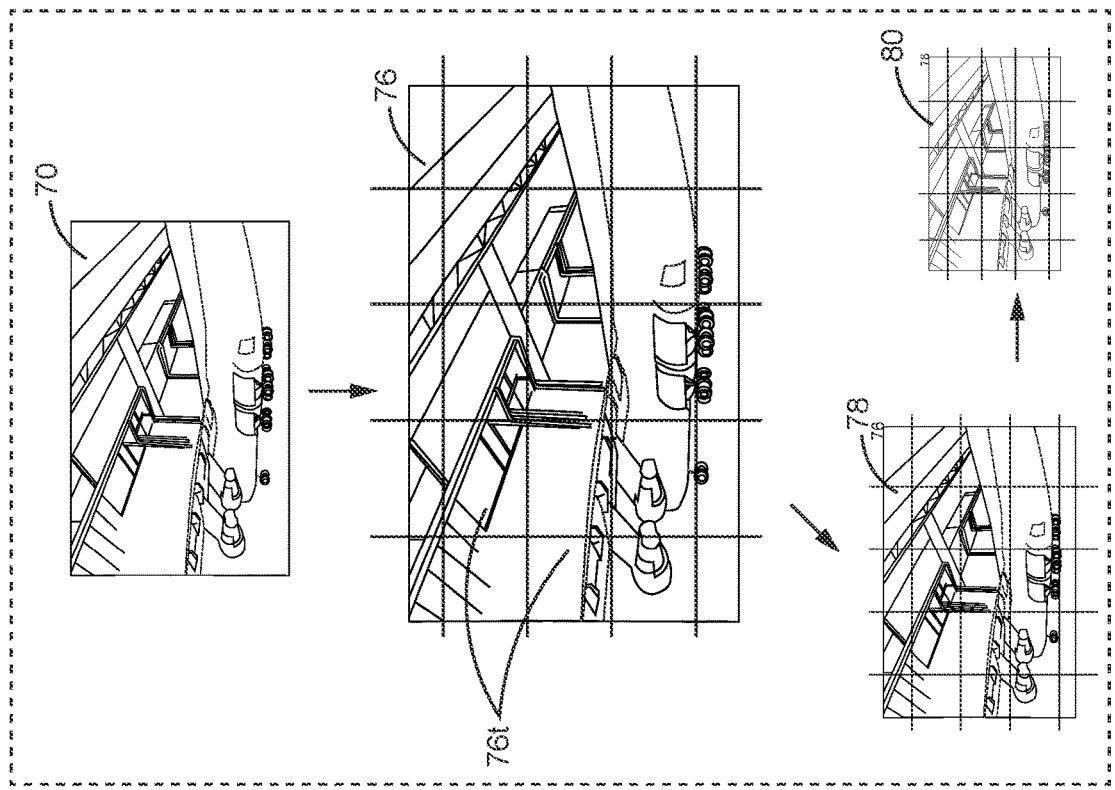
FIG. 4B illustrates a digital image being processed according to one aspect of the present disclosure.
Figure 4A:
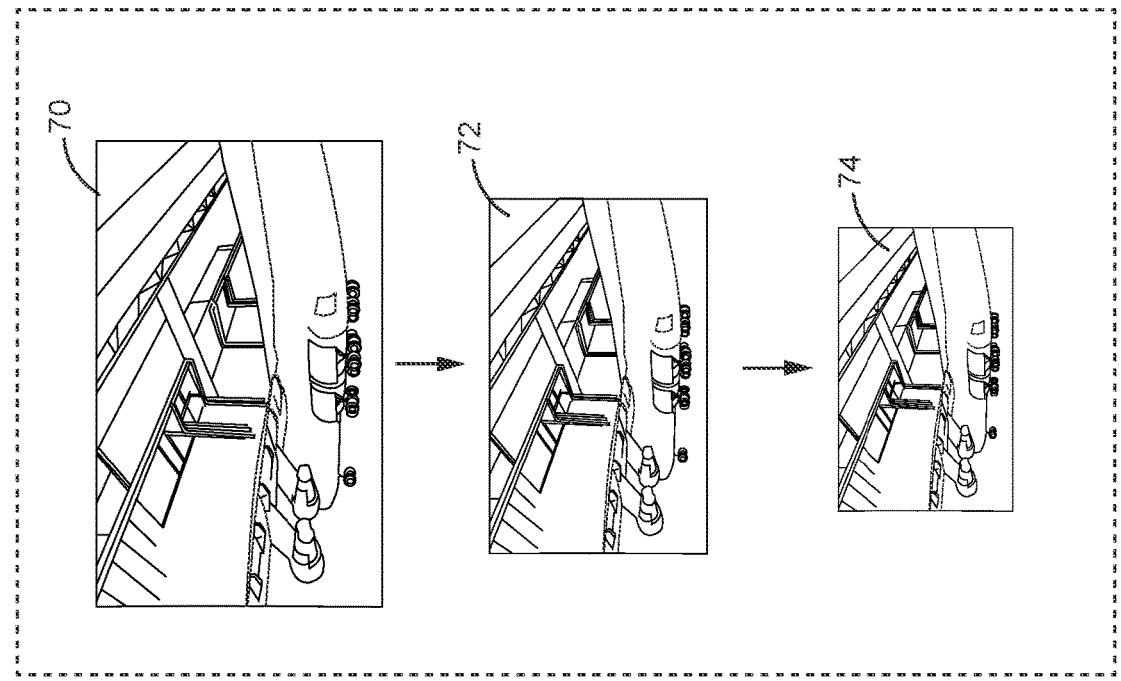
FIG. 4A illustrates a digital image being processed according to a conventional digital image processing technique.

For example, FIGS. 4A-4B illustrate a conventional digital image processing technique (FIG. 4A) as compared to the digital image processing technique utilized in one aspect of the present disclosure (FIG. 4B).

With conventional digital image processing techniques (FIG. 4A), an original digital image 70 is first downsized (72, 74) before being resized to a larger size. Such downsizing may occur at different stages or times during the digital image processing. As is known in the art, downsizing reduces the number of pixels in the image, and thus, reduces the time needed to load an image for processing. The smaller image size also facilitates storing the images. However, the reduction in the number of pixels also causes a loss of image quality. That is, because pixel information is lost when downsizing, the image will not be as clear as it was originally when the size of the image is subsequently increased to a larger size.

As seen in FIG. 4B, however, aspects of the present disclosure contradict such conventional techniques by first "scaling-up" the original image 70 to generate a scaled-up image 76. Additionally, during the training method of the present disclosure, the scaled-up image 76 is partitioned into a plurality of tiles $76_t$. Scaling-up the image first effectively makes the pool size of the first layer "one," and uses all the pixel data in the image. This maximizes the effects of the changes to max pooling. The contrast of the image is then enhanced to amplify the effects of the contrast relative to the ambient light, and downsized for processing. The resultant downsized image 78 may then be downsized once again for storage.

Figure 5:
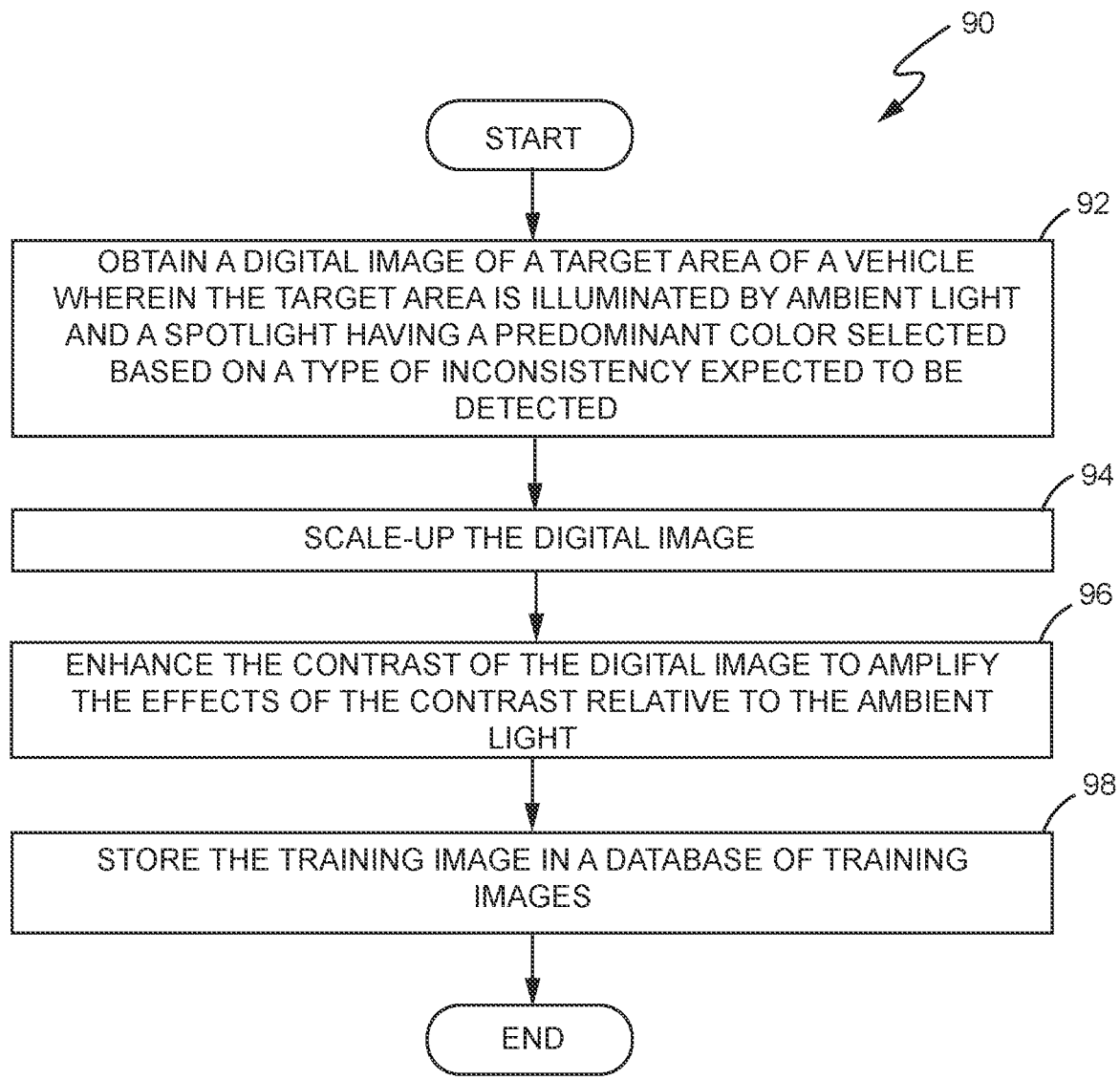
FIG. 5 is a flow diagram illustrating a method for processing digital images for training a neural network according to one aspect of the present disclosure.

FIG. 5 is a flow diagram illustrating a method 90 of processing an original digital image 70 during the training stage according to one aspect of the present disclosure. As seen in FIG. 5, method 90 first obtains a digital image 70 of a target area T of a vehicle (e.g., aircraft 10) (box 92). The target area T, in this embodiment, is illuminated by an ambient light (e.g., blue light) and a spotlight S that is brighter than the ambient light. Once the digital image 70 is obtained, method 90 up-scales the digital image 70 to form an up-scaled digital image 76 (box 94). Method 90 then enhances the contrast of the up-scaled digital image 76 to amplify the effects of the contrast relative to the ambient light (box 96) and downsizes the up-scaled digital image 76 to generate a downsized digital image 78. The downsized digital image 78 may then be stored in a training database as is, or downsized once again to form a training image 80 before storing the image in a training database (box 98).

Figure 6:
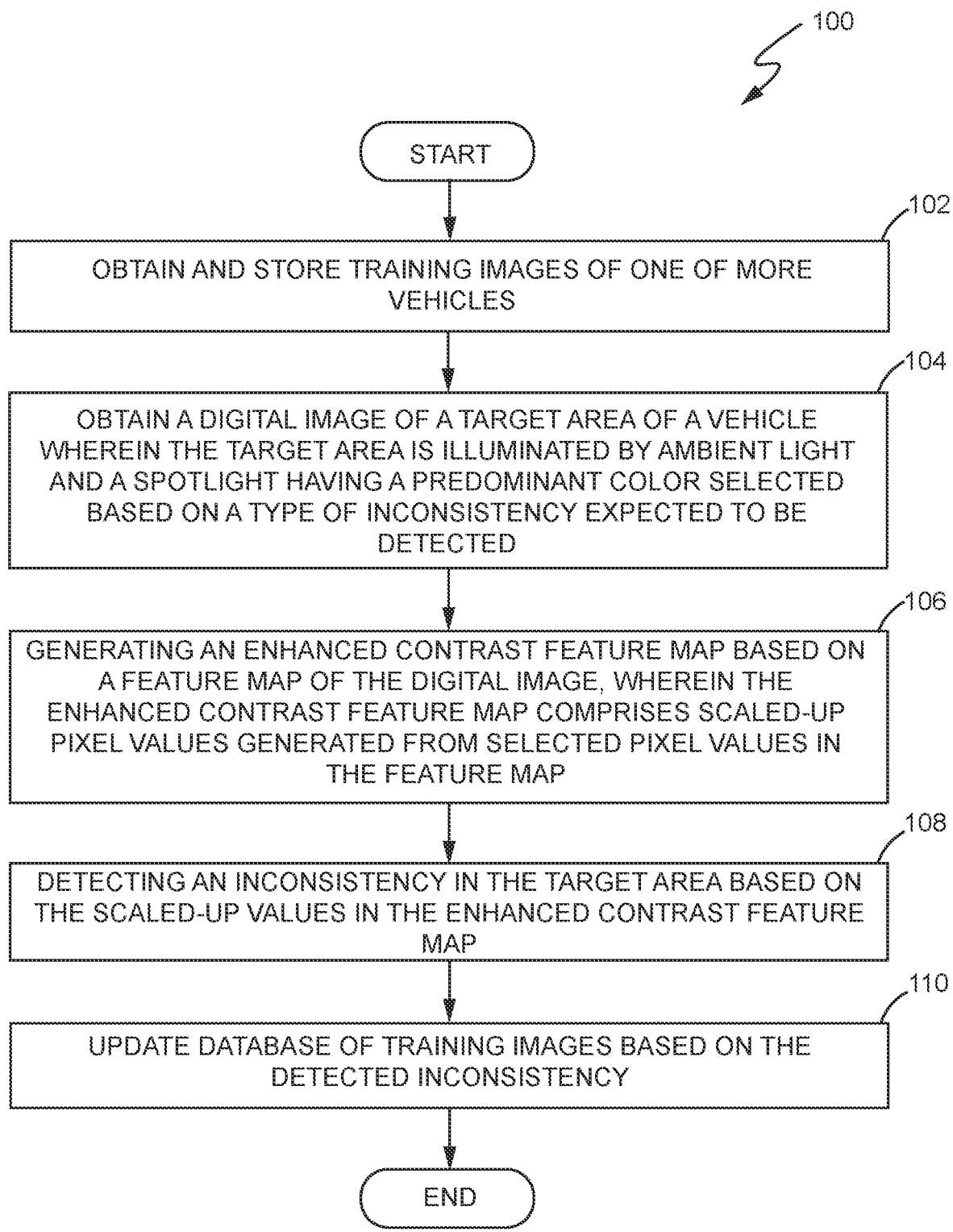
FIG. 6 is a flow diagram illustrating a method for detecting an inconsistency on a vehicle according to one aspect of the present disclosure.

FIG. 6 is a flow diagram illustrating a method 100 for detecting an inconsistency 30 on a vehicle, such as aircraft 10, according to one aspect of the present disclosure. As seen in FIG. 6, method 100 begins with obtaining and storing one or more training images of one or more vehicles, such as aircraft 10 (box 102). These images, as described in more detail later, are digitally processed and used in an iterative process that calculates the weighting coefficient. Thereafter, method 100 calls for obtaining a digital image of the target area T of aircraft 10 (box 104). In this aspect, target area T is illuminated by ambient light A and spotlight S, both of which are the same color that is selected based on the type of inconsistency that is expected to be detected. The spotlight S is, as stated previously, a higher intensity light that ambient light A and may be emitted by UAV 20, which also captures the digital images of the target area T.

With the digital images obtained, method 100 then calls for generating an enhanced contrast feature map 60 based on a feature map 50 of the digital image (box 106). As detailed more below, the enhanced contrast feature map 60 comprises the scaled-up pixel values generated from selected pixel values in the feature map 50. So generated, method 100 calls for detecting a inconsistency 30 in the target area T based on the scaled-up values in the enhanced contrast feature map 60 (box 108). As previously described, the scaled-up values of the enhanced contrast feature map 60 enhance the contrast between the inconsistency 30 and the background making it easier to detect even small inconsistencies 30. Then, the database of training images is updated based on the detected inconsistency 30 (box 110). Updating the database in this manner allows the aspects of the present disclosure to "learn" about the inconsistencies 30, thereby increasing the accuracy with which various inconsistencies 30 can be detected in the future.

Figure 7:
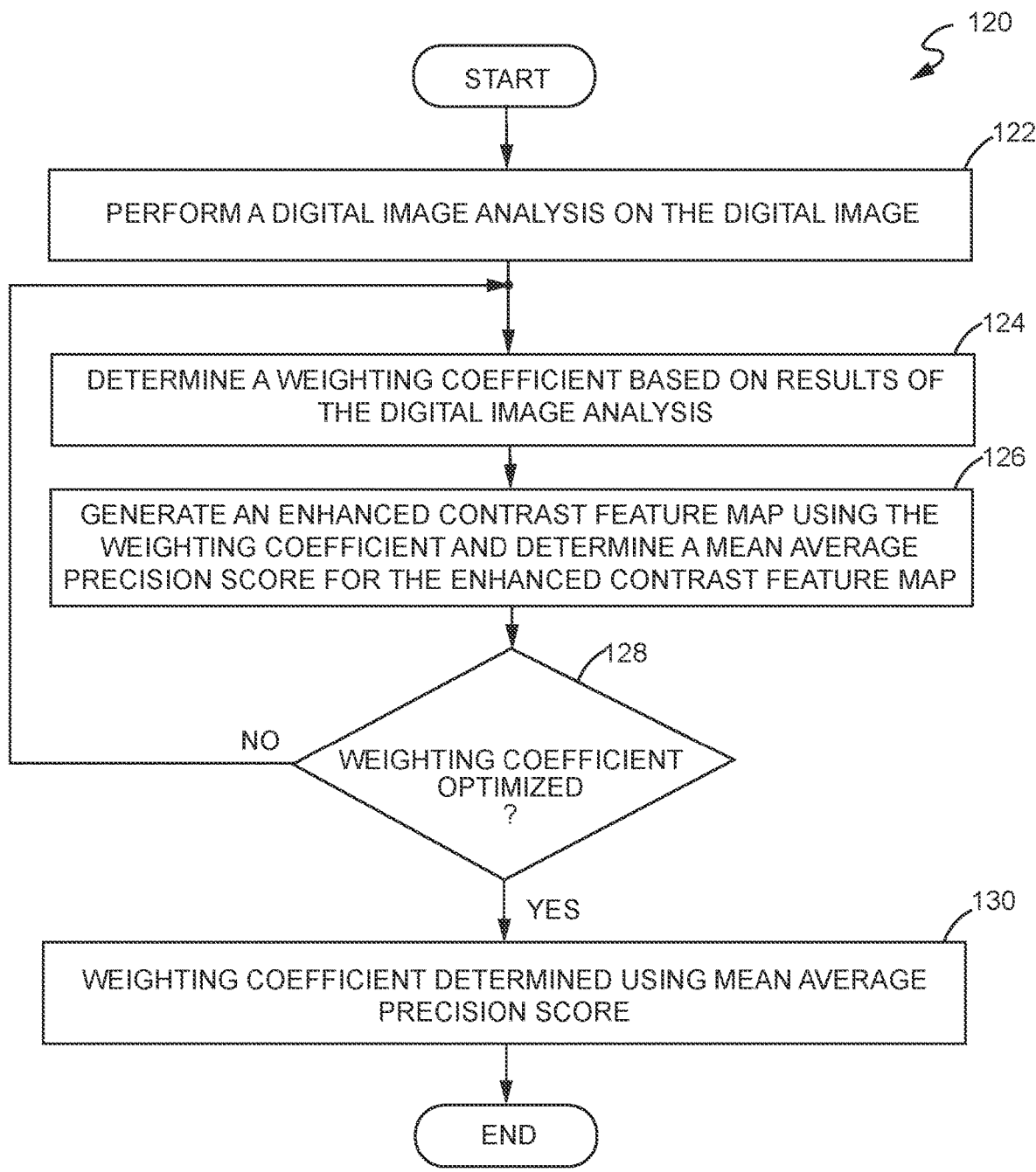
FIG. 7 illustrates a method for determining a weighting coefficient according to one aspect of the present disclosure.

FIG. 7 illustrates a method 120 for determining a weighting coefficient according to one aspect of the present disclosure. Method 120 assumes that the implementing computing device has obtained, or has access to, the digital images of the target area T captured by UAV 20, as well as the training images stored in memory or other long-term storage. Thus, method 120 performs a digital image analysis on the digital image captured by UAV 20 (box 122), and then determines a weighting coefficient based on the results of the digital image analysis (box 124). In one aspect, for example, the implementing computing device first makes an educated guess at the value of the weighting coefficient and generates the enhanced contrast feature map 50. This guess may, for example, be based on the characteristics of the ambient light A, the spotlight S, the expected color distribution for the background, and/or the particular inconsistency 30 of interest. Regardless, however, the initial guess at the value for the weighting coefficient is determined so as to magnify the non-dominate background colors (i.e., the colors not associated with the inconsistency 30 of interest) thereby increasing the contrast that exists between the inconsistency 30 of interest and the background.

The computing device then uses the weighting coefficient to generate the enhanced contrast feature map 50 and determine a mean average precision score for the enhanced contrast feature map 50 (box 126). As stated above, the mean average precision score is a computed value between 0 and 1 that indicates how well the model for detecting inconsistencies works. As such, the mean average precision score also indicates whether the weighting coefficient used to generate the enhanced contrast feature map 50 is optimized.

The mean average precision score is then compared to the mean average precision score associated with a previously generated enhanced contrast feature map 50 to determine which of the compared mean average precision scores is most optimal (e.g., which of the generated mean average precision scores is closest to 1) (box 128). This process (i.e., determining a weighting coefficient (box 124), generating the enhanced contrast feature map 50 based on that weighting coefficient and comparing the mean average precision score for the enhanced contrast feature map 50 (box 126), and comparing the mean average precision score to a previously generated mean average precision score for a previously generated enhanced contrast feature map 50 (box 128), is iterative. Thus, as seen in FIG. 7, the process continues until an optimized weighting coefficient is determined. In one aspect, the optimized weighting coefficient is determined to be the weighting coefficient was used to generate the enhanced contrast feature map 50 having the highest mean average precision score (e.g., the highest mean average precision score closest to 1). Provided the implementing computing device has determined the value for the weighting coefficient, it will use the enhanced contrast feature map 50 generated using that value to detect inconsistencies 30 (box 130).

Figure 8:
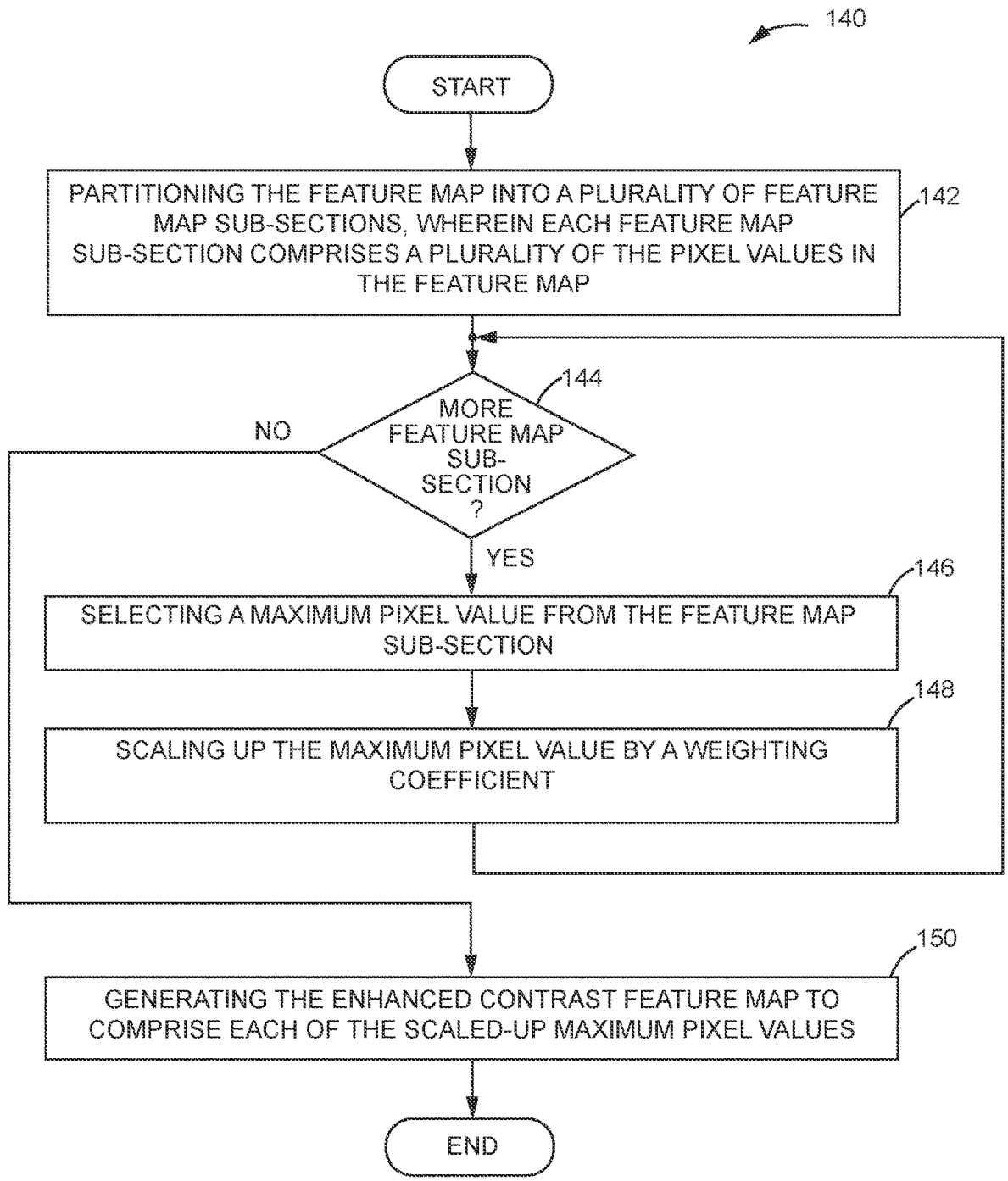
FIG. 8 is a flow diagram illustrating a method for generating an enhanced contrast feature map to detect an inconsistency on a vehicle according to one aspect of the present disclosure.

FIG. 8 is a flow diagram illustrating a method 140 for generating an enhanced contrast feature map 60 to detect inconsistencies 30 on an aircraft 10 according to one aspect of the present disclosure. As seen in FIG. 8, method 140 begins with an implementing computing device partitioning the feature map 50 of an obtained digital image into a plurality of feature map sub-sections 52, 54, 56 (box 142). As previously described, each feature map sub-section 52, 54, 56 comprises a plurality of the pixel values of the feature map. So long as there are feature map subsections 52, 54, 56 to process (box 144), the implementing computing device selects a maximum pixel value from the subsection (box 146), and scales-up the selected pixel value by the previously determined weighting coefficient (box 148). This process continues until no more feature map subsections 52, 54, 56 exist. When all feature map subsections 52, 54, 56 have been processed (box 144), the implementing computing device generates the enhanced contrast feature map to comprise each of the scaled-up maximum pixel values (box 150).

Figure 9:
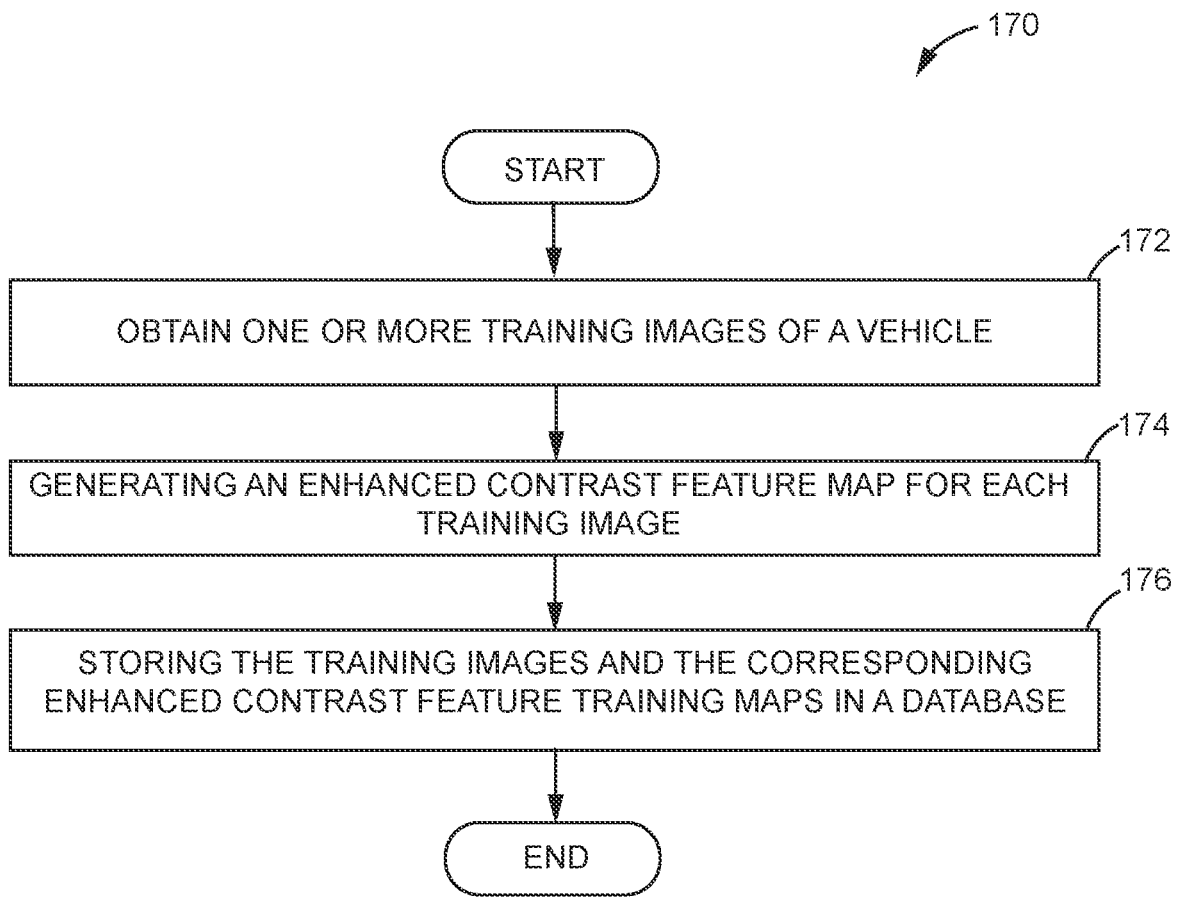
FIG. 9 is a flow diagram illustrating a method for generating and maintaining stored enhanced contrast feature maps of training images according to one aspect of the present disclosure.

FIG. 9 is a flow diagram illustrating a method 170 for generating and maintaining stored enhanced contrast feature maps of training images according to one aspect of the present disclosure. As previously described (e.g., with respect to FIG. 7), the information associated with these training images (e.g., the enhanced contrast feature maps generated based for the training images) are utilized by the present aspects to determine an appropriate weighting coefficient that is then used to generate enhanced contrast feature map 60.

As seen in FIG. 9, method 170 begins with an implementing computing device obtaining one or more training images of one or more target areas T of a vehicle, such as aircraft 10 (box 172). The one or more target areas T in this aspect may or may not include an inconsistency 30. So obtained, method 170 then generates an enhanced contrast feature map for each training image using, for example, previously described methods 120 and 140 of FIGS. 7 and 8, respectively (box 174). So generated, the training images and their corresponding enhanced contrast feature maps are stored in a memory, such as a database, for example box 176), and subsequently utilized to determine the weighting coefficients for use in method 90 of FIG. 5. In one aspect, the enhanced contrast feature maps 60 generated during method 90 of FIG. 5 are used to update the training-related information stored in memory. This helps to ensure that the data used by the present aspects does not go stale.

FIG. 10 is a schematic block diagram illustrating an example computing device 180 configured to implement the previously described methods according to one or more aspects of the present disclosure. In particular, computing device 180 comprises processing circuitry 182 communicatively coupled to a memory 184 that stores one or more control programs 188, and communication circuitry 186.

According to various aspects of the present disclosure, processing circuitry 182 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, processing circuitry 182 includes programmable hardware capable of executing software instructions stored, e.g., as a machine-readable computer control program 188 in memory 184.

More particularly, processing circuitry 182 is configured to execute control program 188 to obtain a digital image of a target area T of a vehicle illuminated by both ambient light and a spotlight, generate an enhanced contrast feature map based on a feature map of the digital image, in which the enhanced contrast feature map comprises scaled-up pixel values generated from selected pixel values in the feature map, and detect an inconsistency in the target area T based on the scaled-up values in the enhanced contrast feature map, as previously described. Additionally, processing circuitry 182 is also configured to execute control program 188 to process one or more training images used to train a neural network, as previously described.

Memory 184 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 10, memory 184 comprises circuitry configured to store control program 138. In one or more aspects, however, memory 184 is also configured to store enhanced contrast feature maps 60, as well as the digital images, including the training images, as previously described.

Communications circuitry 186 comprises circuitry configured to control the input and output (I/O) data paths of the computing device 180. The I/O data paths include data paths for exchanging signals with other computers and mass storage devices over a communications network (not shown). Such signals include, but are not limited to, those that are needed to obtain the digital images and/or the training images previously described from a storage location that is external to computing device 180. Such storage locations include, for example, databases. In some aspects, communications circuitry 186 comprises an ETHERNET card configured to communicate signals and data with one or more remote devices via one or more communications networks (not shown).

Although not illustrated in the figure, computing device 180 may, as is known in the art, further comprise one or more User Input/Output (I/O) devices. These I/O devices may comprise any device known in the art that allow a user to interact with the computing device 180. Such I/O devices can include, but are not limited to, microphones, speakers, display devices (such as a Liquid Crystal Display (LCD) and/or a Light Emitting Diode (LED) display for presenting visual information to a user), keyboards, keypads, a pointer device, such as a mouse, and the like.

FIG. 11 is a schematic block diagram illustrating processing circuitry 182 implemented according to different hardware units and software modules (e.g., as control program 188 stored in memory 184) according to one aspect of the present disclosure. As seen in FIG. 11, processing circuitry 182 implements a communications interface unit/module 190, a digital image obtaining unit/module 192, an enhanced contrast feature map generating unit/module 194, an inconsistency detection unit/module 196, and a training data storage unit/module 198.

The communications interface unit/module 190 is configured to facilitate communications between computing device 180 and one or more remotely located devices (e.g., application servers, databases, UAV 20, etc.) via one or more communication networks. Such networks may include, but are not limited to, ETHERNET-based computer networks as well as wireless networks.

The digital image obtaining unit/module 192 is configured to obtain the one or more digital images for processing by computing device 180. As previously described, the digital images may be obtained from a database, another computing device, or UAV 20. According to aspects of the present disclosure, the digital image obtaining unit/module 192 is configured to obtain digital images so that computing device 130 can detect inconsistencies 30 during an inspection process, for example, and train the network to support such inconsistency detection operations.

The enhanced contrast feature map generating unit/module 194 is configured to generate enhanced contrast feature maps 60 based on feature maps 50 of the digital images. As previously described, the enhanced contrast feature maps comprise scaled-up pixel values generated from selected pixel values in the feature maps. To that end, the enhanced contrast feature map generating unit/module 194 is configured to iteratively determine the weighting coefficients used in generating the enhanced contrast feature maps 60, partition the feature maps 50 into a plurality of feature map sub-sections 52, 54, 56, and for each feature map sub-section, select a maximum pixel value from the feature map sub-section, scale-up the maximum pixel value by the weighting coefficient, and generate the enhanced contrast feature maps 60 to comprise the scaled-up maximum pixel values.

The inconsistency detection unit/module 196 is configured to detect inconsistencies 30 in the target area T of the processed digital images based on the scaled-up values in the enhanced contrast feature maps 60. The training data storage unit/module 198 is configured to update the training database with the enhanced contrast feature maps 60, and in some aspects the one or more digital images, in order to increase the accuracy of subsequent inconsistency detection functions.

As stated previously, aspects of the present disclosure may be utilized to detect inconsistencies 30 in an aircraft 10. However, aircraft 10 is not the only type of vehicle suitable for use with the present aspects. As seen in FIG. 12, for example, aspects of the present disclosure may also be utilized to detect inconsistencies 30 on spacecraft 200, automobiles that utilize fossil fuels 202, rotorcraft 204 such as helicopters, surface craft 206 such as boats, unmanned and/or remotely controlled aircraft such as UAV 20, and while not specifically illustrated herein, submersible craft such as submarines.

Aspects of the present disclosure further include various methods and processes, as described herein, implemented using various hardware configurations configured in ways that vary in certain details from the broad descriptions given above. For instance, the previous aspects of the present disclosure have been described in terms of a single computing device 180. However, those of ordinary skill in the art should readily appreciate that this is for illustrative purposes and ease of discussion only. Aspects of the present disclosure are not limited to operation on a single machine, but instead, such operation may be distributed across multiple computing devices 130.

For example, aspects of the present disclosure may be implemented, partially or entirely, using a neural network. Neural networks, as is known in the art, comprise algorithms that are specially configured to recognize the relationships that exist between data. These algorithms may be executed on a single computing device 180, but are typically executed on a plurality of computing devices 180. Recognition of the relationships is based on information that is "learned" by the neural network over time and over many iterations.

In the context of the present disclosure, the neural network comprises one or more computing devices 180. Each computing device 180 is trained over time to detect inconsistencies using a combination of known computer vision techniques, as well as those described above (i.e., methods 90, 100, 120, 140, and 170). Particularly, the computing devices 180 in the neural network may be configured to determine weighting coefficients, generate enhanced contrast feature maps 50 based on the weighting coefficients, and generate mean average precision scores for the enhanced contrast feature maps 50, as previously described. The computing devices 180 in the neural network are also configured to compare the mean average precision scores for each of the generated enhanced contrast feature maps 50, and based on that comparison, determine which of the weighting coefficients is an optimized weighting coefficient. As stated above, the optimized weighting coefficient is the value that is used to generate the enhanced contrast feature map 50 having a mean average precision score that is closest in value to 1. Additionally, the optimized weighting coefficient, the digital images, and the generated enhanced contrast feature map 50 are saved to memory and, in at least one aspect, used to further train the neural network to select optimal weighting coefficients for generating the enhanced contrast feature maps 50.

Additionally, it should be noted by those of ordinary skill in the art that one or more of the processing functionalities discussed above may be implemented using dedicated hardware, rather than a microprocessor configured with program instructions, depending on, e.g., the design and cost tradeoffs for the various approaches, and/or system-level requirements.

Those of ordinary skill in the art will also appreciate that the present disclosure is not limited solely to the aspects discussed herein. As such, the aspects of the present disclosure are not limited by the foregoing description and accompanying drawings. Instead, the aspects of the present disclosure are limited only by the following claims and their legal equivalents.

What is claimed is:

1. A computing device comprising:
   a memory configured to store computer-readable program code; and
   processing circuitry configured to access the memory, and to execute the computer-readable program code to cause the computing device to:
   obtain a digital image of a target area of a vehicle, wherein the target area is illuminated by ambient light and a spotlight having a predominant color that is selected based on a type of inconsistency expected to be detected;
   generate an enhanced contrast feature map based on a feature map of the digital image, wherein the enhanced contrast feature map comprises:
   a plurality of feature map sub-sections with each sub-section being associated with a different color channel; and
   scaled-up pixel values generated from selected pixel values in the feature map, wherein a weighting coefficient used to scale-up the selected pixel values is different for each color channel; and
   detect an inconsistency in the target area based on the scaled-up pixel values in the enhanced contrast feature map.

2. The computing device of claim 1 wherein:
   the ambient light and the spotlight are a same color light; and
   the spotlight is a higher intensity than the ambient light.

3. The computing device of claim 2 wherein the color of the ambient light and the spotlight is different than a color of the inconsistency.

4. The computing device of claim 1 wherein the processing circuitry is further configured to obtain the digital image of the target area of the vehicle from an unmanned aerial vehicle (UAV) proximate the target area.

5. The computing device of claim 1 wherein to obtain a digital image of a target area of a vehicle, the processing circuitry is configured to perform a calibration procedure in which the processing circuitry is configured to:
   perform a digital image analysis on the digital image; and
   determine the weighting coefficient based on a result of the digital image analysis.

6. The computing device of claim 5 wherein the processing circuitry is configured to iteratively determine the weighting coefficient based on the result of the digital image analysis.

7. The computing device of claim 5 wherein the processing circuitry is configured to determine the weighting coefficient based on a mean average precision score calculated for the enhanced contrast feature map.

8. The computing device of claim 5 wherein to generate the enhanced contrast feature map, the processing circuitry is configured to:
   partition the feature map into the plurality of feature map sub-sections, wherein each feature map sub-section comprises a plurality of pixel values in the feature map;
   for each of the plurality of feature map sub-sections:
   select a pixel value from the feature map sub-section; and
   scale-up the pixel value by the weighting coefficient; and
   generate the enhanced contrast feature map to comprise each of the scaled-up pixel values.

9. The computing device of claim 8 wherein the weighting coefficient is proportional to an expected amount of light in a same spectrum of the ambient light and the spotlight.

10. The computing device of claim 8 wherein the weighting coefficient is defined based on the color of the ambient light illuminating the vehicle and a color of the target area of the vehicle.

11. The computing device of claim 8 wherein to scale-up the selected pixel value, the processing circuitry is further configured to multiply the selected pixel value by the weighting coefficient.

12. The computing device of claim 11 wherein to detect the inconsistency in the target area, the processing circuitry is configured to compare the scaled-up pixel values in the enhanced contrast feature map to scaled-up training values in one or more enhanced contrast feature maps associated with corresponding training images.

13. The computing device of claim 12 wherein weighting coefficients used to scale-up the scaled-up pixel values in the enhanced contrast feature map are the same as the weighting coefficients used to scale-up the training values in the one or more enhanced contrast feature maps.

14. A method comprising:
   obtaining a digital image of a target area of a vehicle, wherein the target area is illuminated by ambient light and a spotlight having a predominant color that is selected based on a type of inconsistency expected to be detected;

generating an enhanced contrast feature map based on a feature map of the digital image, wherein the enhanced contrast feature map comprises:
- a plurality of feature map sub-sections with each sub-section being associated with a different color channel; and
- scaled-up pixel values generated from selected pixel values in the feature map, wherein a weighting coefficient used to scale-up the selected pixel values is different for each color channel; and detecting an inconsistency in the target area based on the scaled-up pixel values in the enhanced contrast feature map.

15. The method of claim 14 wherein a color of the ambient light is the same as a color of the spotlight and different than a color of the inconsistency.

16. The method of claim 14 wherein obtaining a digital image of a target area of a vehicle comprises performing a calibration procedure comprising:
performing a digital image analysis on the digital image; and
determining the weighting coefficient based on results of the digital image analysis.

17. The method of claim 16 wherein determining the weighting coefficient based on results of the digital image analysis comprises iteratively determining the weighting coefficient based on the results of the digital image analysis.

18. The method of claim 16 wherein the weighting coefficient is determined based on a mean average precision score calculated for the enhanced contrast feature map.

19. The method of claim 16 wherein generating an enhanced contrast feature map comprises:
partitioning the feature map into the plurality of feature map sub-sections, wherein each feature map sub-section comprises a plurality of pixel values in the feature map;
for each feature map sub-section:
  selecting a pixel value from the feature map sub-section; and
  scaling-up the pixel value by the weighting coefficient; and
generating the enhanced contrast feature map to comprise each of the scaled-up pixel values.

20. The method of claim 19 wherein the weighting coefficient is proportional to an expected amount of light in a spectrum that is the same as a light spectrum of the ambient light and the spotlight.

21. The method of claim 19 wherein the weighting coefficient is determined based on the color of the ambient light illuminating the vehicle and a color of the vehicle.

22. The method of claim 19 wherein scaling-up the pixel value comprises multiplying the pixel value by the weighting coefficient of a corresponding color channel.

23. The method of claim 14 wherein detecting an inconsistency in the target area based on the scaled-up pixel values in the enhanced contrast feature map comprises comparing the scaled-up pixel values in the enhanced contrast feature map to scaled-up training values in one or more enhanced contrast feature maps associated with corresponding training images.

24. The method of claim 23 wherein weighting coefficients used to scale-up the scaled-up pixel values in the enhanced contrast feature map are the same as the weighting coefficients used to scale-up the training values in the one or more enhanced contrast feature maps.

25. A non-transitory computer-readable medium comprising instructions stored thereon that, when executed by processing circuitry of a computing device, configure the computing device to:
obtain a digital image of a target area of a vehicle, wherein the target area is illuminated by ambient light and a spotlight having a predominant color that is selected based on a type of inconsistency expected to be detected;
generate an enhanced contrast feature map based on a feature map of the digital image, wherein the enhanced contrast feature map comprises:
  a plurality of feature map sub-sections with each sub-section being associated with a different color channel; and
  scaled-up pixel values generated from selected pixel values in the feature map, wherein a weighting coefficient used to scale-up the selected pixel values is different for each color channel; and
detect an inconsistency in the target area based on the scaled-up pixel values in the enhanced contrast feature map.

26. The computing device of claim 8, wherein to scale-up the pixel value, the processing circuitry is configured to multiply the pixel value by the weighting coefficient of a corresponding color channel.

* * * * *